Patented Jan. 19, 1932

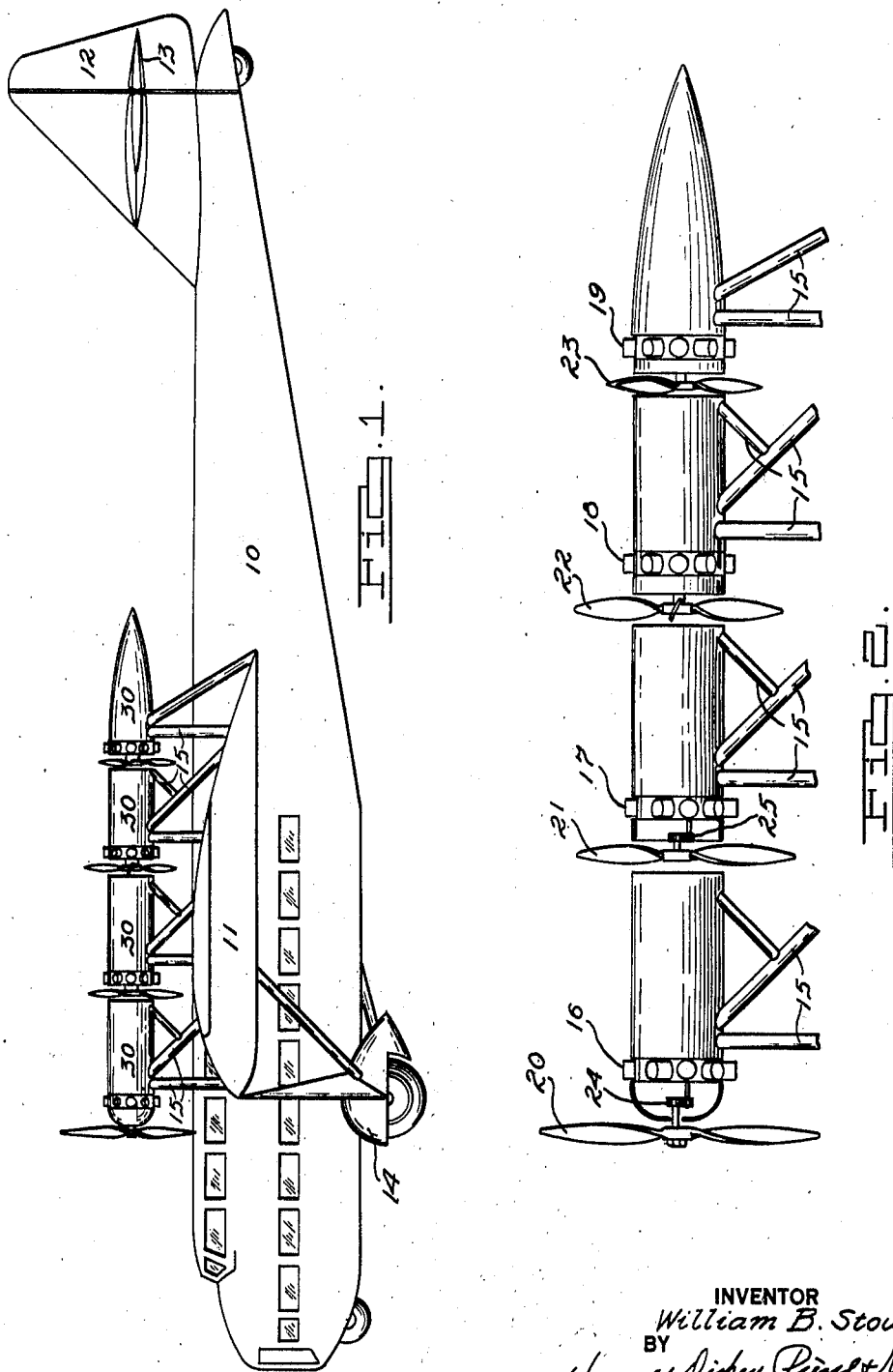

1,842,055

UNITED STATES PATENT OFFICE

WILLIAM B. STOUT, OF DETROIT, MICHIGAN

AIRPLANE

Application filed March 28, 1930. Serial No. 439,593.

This invention relates to airplanes, and particularly to the driving means therefor, the principal object being the provision of a new and novel arrangement of power plants and propellers into a single unit.

Another object is the provision of means for mounting an engine upon an airplane whereby maximum efficiency may be obtained with minimum parasitic resistance.

Another object is to provide a novel multiple power plant unit for airplanes.

Another object is the provision of an airplane provided with one or more power plant units, each of which includes a plurality of engines arranged in alignment longitudinally of the airplane, and each of the engines driving a propeller, one or more of such propellers being connected to its corresponding power plant for equal rotation therewith and one or more of such propellers being connected to its corresponding power plant through means causing it to be driven at a different rate of rotation than its corresponding power plant.

Another object is to provide a power plant unit for airplanes and the like including a plurality of engines arranged in substantial alignment longitudinally of the airplane, each of said engines being provided with a propeller, and means being provided between one or more of said propellers and the corresponding engine whereby said propeller may be driven at a rate of rotation different from another propeller in the unit without a corresponding difference in the speed of rotation of the engines.

Another object is to provide a power plant unit for airplanes and the like including a plurality of engines arranged in substantial alignment longitudinally of the airplane, each of said engines being provided with a propeller, means being provided whereby the engines may run at substantially the same speed and the propellers at different speeds, and the propellers varying from each other in diameter and pitch to correspond with their differences in speed of rotation.

A further object is to provide a power plant unit for airplanes and the like including a plurality of power plants arranged in substantially aligned condition longitudinally of the airplane, each of said engines being provided with a propeller, and means being provided whereby the propellers at the rear of the engines are driven at a higher speed of rotation than the propellers at the front end of the unit without necessitating a corresponding difference in the rate of rotation of the respective engines.

The above being among the objects of the present invention, the same consists of certain novel features of construction and combinations of parts to be hereinafter described with reference to the accompanying drawings, and then claimed, having the above and other objects in view.

In the accompanying drawings which show a suitable embodiment of the present invention, more or less diagrammatically, and in which like numerals refer to like parts throughout the several views, Fig. 1 is a more or less diagrammatic side elevation of an airplane.

Fig. 2 is an enlarged partially broken side elevation of the power plant unit shown in Fig. 1.

The construction disclosed herein is related to the construction disclosed in my co-pending application executed on even date herewith, Ser. No. 439,591, filed March 28, 1930, and it is to be understood that the main features disclosed in said application are equally applicable to the present application. It is to be understood, however, that the present invention is not to be totally restricted to all of the various features disclosed in the above identified application.

Referring to the accompanying drawings, I show an airplane comprising a fuselage 10, wings 11, rudder 12, elevator 13 and suitable landing gear 14. Supported above the fuselage 10, and by the wings 11 where necessary or desirable, by suitable struts such as 15 are one or more power plant units. Each power plant unit consists of a plurality of engines, four of which, 16, 17, 18 and 19, are included in the particular embodiment shown. It will be apparent from the following description that the particular number of engines used in a single power plant unit is relatively immaterial as far as the broader aspects of the present invention are concerned, as long as a plurality of engines are provided in each unit. The engines 16, 17, 18 and 19 are all supported by the struts 15, in substantial alignment longitudinally of the airplane. Suitable fairing such as 30 is preferably provided enclosing part or all of each of the engines and suitably shaped so as to offer substantially only the equivalent of the head resistance of a single engine to forward movement of the airplane. Each engine is provided with a propeller, the engine 16 being provided with a propeller 20, the engine 17 by the propeller 21, the engine 18 by the propeller 22, and the engine 19 by the propeller 23. The propellers are preferably arranged ahead of their respective engines so that when the airplane is taxiing on the ground each engine will be cooled by the blast of air from its corresponding propeller. In accordance with the above identified application, the propeller 20 is shown as being larger in diameter than the remainder of the propellers and as a two-bladed propeller, the propeller 21 is shown as being slightly smaller than the propeller 20 and as a three-bladed propeller, the propeller 22 is shown as being smaller in diameter than the propeller 21 and as a four-bladed propeller, and the propeller 23 is shown as being smaller than any of the other propellers and as a four-bladed propeller. The propellers 20 to 23, inclusive, are preferably reduced in diameter from the front end of the power plant to the rear end thereof an amount sufficient to insure each propeller rearwardly of the foremost propeller working in the slip-stream of the propeller forwardly thereof. This, likewise, is in accordance with the above indentified application.

In accordance with the present invention means are provided whereby the propellers at the rear end of the unit are driven at a higher rotational speed than the propellers at the front end of the unit. This may be accomplished in any one of several different ways. The particular means shown comprises a reduction gearing shown diagrammatically as at 24 connecting the engine 16 with the propeller 20, and a reduction gearing shown diagrammatically as at 25 connecting the engine 17 with the propeller 21. The propellers 22 and 23 are shown as being driven directly from their corresponding engines 18 and 19 respectively without the interposition of any gearing whatsoever. Assuming that the engines 16 to 19, inclusive, are all of the same size and are driven at the same rate of rotation, as is desirable, it will be apparent that the propellers 20 and 21 will be driven at a slower speed of rotation than the propellers 22 and 23. The same effect may of course be obtained by driving the propellers 22 and 23 directly from their respective engines and by driving the propellers 20 and 21 through suitable gearing causing them to rotate at a slower rate of rotation than the rate of rotation of their corresponding engines 18 and 19. In a like manner, all of the propellers may be driven through suitable gearings whereby a uniform increase of air speed may be obtained throughout the propellers from the front of the unit to the rear end thereof. The particular means for accomplishing this end is relatively unimportant as long as the engines in each unit are driven at substantially the same speed and the propellers or propeller at the rear end of the unit is driven at a higher rate of speed than the propeller at the front end of the unit. I prefer, however, to gear down the propellers at the front end of the unit so that I may cause the engines to rotate at a more efficient speed without necessitating rotating the propellers at a speed sufficiently high to cause relatively rapid breakdown thereof.

It will, of course, be obvious that the propeller 21 will be working in the slip-stream of the propeller 20, the propeller 22 in the slip-stream of both the propellers 20 and 21, and the propeller 23 in the slip-stream of the propellers 20, 21 and 22. Thus each propeller from front to rear of the unit will be working in a medium having a relatively higher rate of flow toward the same than the propeller immediately in advance thereof, and it will be apparent that by increasing the rotational speed of the propellers in accordance with the increased velocity of the slip-stream in which it works I am enabled to employ propellers each of which is designed with a pitch of maximum efficiency and am enabled to obtain an equal propulsive effort from each propeller. By this it is not to be understood that all of the propellers necessarily have identically the same pitch, although this may be the fact in some cases, and in the case shown where the propellers 20 and 21 have the same rate of rotation and the propellers 22 and 23 have the same rate of rotation, the pitch of the propeller 21 is preferably slightly greater than the propeller 20, and the pitch of the propeller 23 is slightly greater than the pitch of the propeller 22.

Likewise it is not essential to the broader aspects of the present invention that the number of blades per propeller increase successively from the front to the rear of the unit, although this is desirable, nor is it absolutely necessary in the broader aspects of the invention that the diameter of the propellers successively decrease from the front of the unit to the rear, although this latter feature is desirable in order to prevent possible blade tip flutter caused by the blades of the propellers passing into and out of the slip-stream of the propeller or propellers ahead of it.

Formal changes may be made in the specific embodiment of the invention described without departing from the spirit and substance of the broad invention, the scope of which is commensurate with the appended claims.

What I claim is:

1. In an airplane, in combination, a plurality of structurally independent engine units supported in substantial alignment longitudinally of the airplane, a propeller for each of said engines, the propeller and engines being in alternating relation, and means connecting said propellers with their corresponding engines whereby one or more of said propellers is driven at a speed of rotation different than one or more of the remaining of said propellers without a corresponding difference in the rate of rotation of the corresponding engines.

2. In an airplane, in combination, a plurality of engines supported in spaced relation and substantial alignment longitudinally of the airplane, an independent propeller for each of said engines, the propeller and engines being in alternating relation, and means connecting each of said propellers with its corresponding engine whereby the rearmost of said propellers is driven at a higher speed of rotation than the foremost thereof without a corresponding difference in the rate of rotation of the corresponding engines.

3. In an airplane, in combination, a plurality of engines supported in substantial alignment longitudinally of the airplane, a propeller for each of said engines, the propeller and engines being in alternating relation, and separate means connecting the foremost and the rearmost of said propellers to their corresponding engines whereby said foremost and rearmost propellers are driven at different rates of rotation without a corresponding difference in the rate of rotation of their corresponding engines.

4. In an airplane, in combination, a plurality of engines supported in substantial alignment longitudinally of the airplane, an independent propeller for each of said engines, the propeller and engines being in alternating relation, one or more of said propellers being connected to its corresponding engine for driving movement therefrom at a rate of rotation equal thereto, gear means connecting another of said propellers to its corresponding engine whereby it will be driven at a rate of rotation different from that of its corresponding engine.

5. In an airplane, in combination, a plurality of engines supported in substantial alignment longitudinally of the airplane, an independent propeller for each of said engines, the foremost of said propellers being connected to its corresponding engine through a speed reducing means and the rearmost of said propellers being connected to its corresponding engine through means driving it at a rate of rotation equal to the speed of rotation of said engine.

6. In an airplane, in combination, a plurality of independent engine units mounted in alignment longitudinally of said aircraft, a separate propeller for each of said engines, the propeller and engines being in alternating relation, at least one of said propellers being connected to its corresponding engine for driving movement at the same rate of rotation as said corresponding engine, and at least one of the remaining propellers being connected to its corresponding engine through a speed change device whereby to be driven at a rate of rotation different from that of its corresponding engine.

WILLIAM B. STOUT.